United States Patent [19]
Cain

[11] Patent Number: 5,966,272
[45] Date of Patent: Oct. 12, 1999

[54] MAGNETORESISTIVE READ HEAD HAVING AN EXCHANGE LAYER

[75] Inventor: William Charles Cain, San Jose, Calif.

[73] Assignee: Read-Rite Corporation, Milpitas, Calif.

[21] Appl. No.: 08/078,917

[22] Filed: Jun. 21, 1993

[51] Int. Cl.[6] .............................. G11B 5/39; G01B 7/14; H01L 43/00
[52] U.S. Cl. ..................... 360/113; 324/207.21; 338/32 R
[58] Field of Search .................... 360/113; 338/32 R; 324/207.21, 252

[56] References Cited

U.S. PATENT DOCUMENTS

| | | | |
|---|---|---|---|
| 4,103,315 | 7/1978 | Hempstead et al. | 360/113 |
| 4,713,708 | 12/1987 | Krounbi et al. | 360/113 |
| 4,785,366 | 11/1988 | Krounbi et al. | 360/113 |
| 5,005,096 | 4/1991 | Krounbi et al. | 360/113 |
| 5,018,037 | 5/1991 | Krounbi et al. | 360/113 |
| 5,206,590 | 4/1993 | Dieny et al. | 360/113 |

*Primary Examiner*—George J Letscher
*Attorney, Agent, or Firm*—Nathan N. Kallman

[57] ABSTRACT

A magnetoresistive (MR) read transducer having an exchange layer adjacent a soft adjacent layer (SAL). The exchange layer generates a transverse bias field which saturates the SAL with little or no sense current.

5 Claims, 1 Drawing Sheet

MAGNETORESISTIVE READ HEAD HAVING AN EXCHANGE LAYER

BACKGROUND OF THE INVENTION

This invention relates to thin film magnetic transducer heads and in particular to magnetic heads including a magnetoresistive layer and a soft adjacent layer for biasing.

The use of a magnetoresistive (MR) sensor to sense or read magnetically recorded data is well known in the art. Also well known is the use of both longitudinal and transverse bias to eliminate Barkhausen noise and to maintain the sensor in its most linear operating range.

An objective in the design of disk drives is to use MR sensors having reduced sizes to facilitate the recording of data on reduced track width media, i.e., increased track density media. As an example, U.S. Pat. No. 5,018,037, issued to Krounbi et al., describes an MR read transducer having a central active region and passive end regions. The end regions of this MR sensor have hard magnetic bias layers which generate a longitudinal bias. The central active region contains a soft adjacent layer (SAL) for transverse biasing. The device described in the patent allows the design of smaller transducers to read the data recorded on reduced track widths at increased recording densities.

Another problem facing the magnetic recording industry is that sufficient sense current to saturate the soft adjacent layer is difficult to achieve in read transducers having reduced sizes. In the Krounbi '037 sensor, the moment ratio between the MR layer and the soft adjacent layer (SAL) assists in saturating the SAL when a sense current is applied. However, the current required to saturate the SAL is on the order of 10 milliamps (mA). In certain applications, this sense current magnitude is especially undesirable. Examples of such applications include small disk drives and narrow gap sensors, in which high current densities are required to properly saturate the soft adjacent layer.

SUMMARY OF THE INVENTION

An object of this invention is to provide an MR read transducer with a soft adjacent layer requiring a low sense current for biasing.

Another object of this invention is to reduce the power required to operate an MR read transducer having a soft adjacent layer for biasing.

In accordance with this invention, an MR read transducer has a central active region and means for generating longitudinal bias. The central active region includes a soft adjacent layer for transverse (linearizing) biasing. The active region also includes an exchange layer which creates an exchange field along a direction transverse to the layers of the active region. The exchange field enables saturation of the soft adjacent layer with little or no applied sense current. The longitudinal biasing is accomplished by passive end regions having hard magnetic bias layers, or by exchange coupling the MR layer to a different antiferromagnetic layer in the lead region.

Preferably, the active region includes four consecutive layers having electrical and magnetic continuity. An MR layer is separated from the soft adjacent layer by a spacer layer. The exchange layer is positioned adjacent the soft adjacent layer, opposite the spacer layer, such that an exchange field is generated. The exchange layer is preferably composed of a nickel oxide/cobalt oxide or an iron manganese material.

BRIEF DESCRIPTION OF THE DRAWINGS

This invention will be described in further detail with reference to the accompanying drawings wherein.

DETAILED DESCRIPTION OF THE INVENTION

Figure 1:
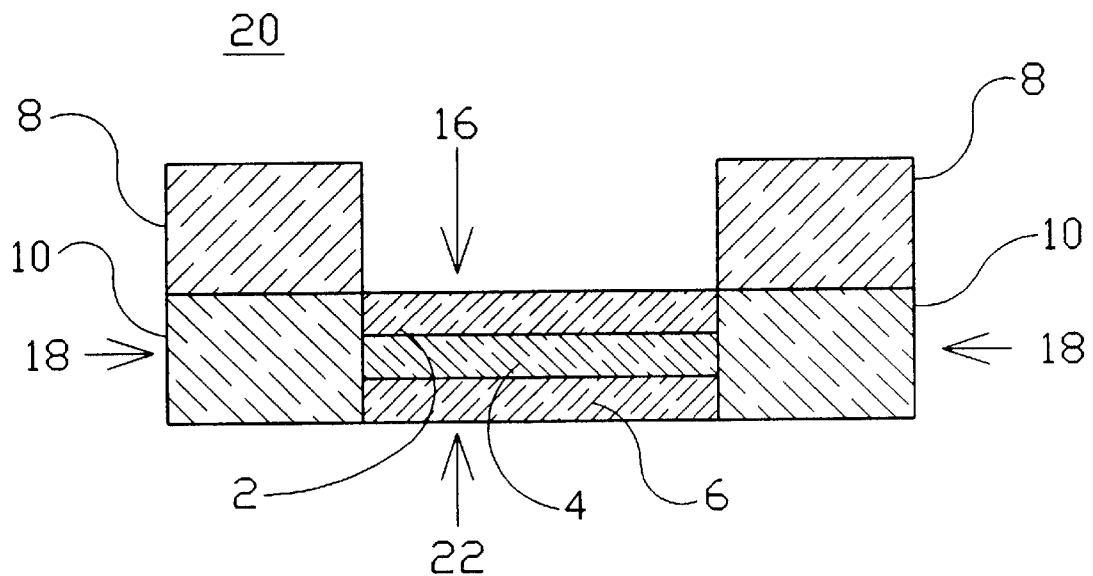
FIG. 1 is a sectional view representing a prior art MR read transducer.

FIG. 1 illustrates an MR read transducer 20 as disclosed in U.S. Pat. No. 5,018,037. A central active layer region 16 is composed of a soft adjacent layer 2 separated from an MR layer 6 by a nonmagnetic spacer layer 4. Passive end regions 18 each include a hard magnetic biasing layer 10 and a conductive layer 8. The central active region 16 is defined by the space between the passive end regions 18.

End regions 18 produce a longitudinal bias field, while a transverse bias field is produced in at least part of the central active region 16. Transverse biasing occurs when a sense current passes through soft adjacent layer 2. The biasing at least partially compensates for hysteresis effects, thereby improving linearity and sensitivity of the signal generated in the transducer.

Figure 2:
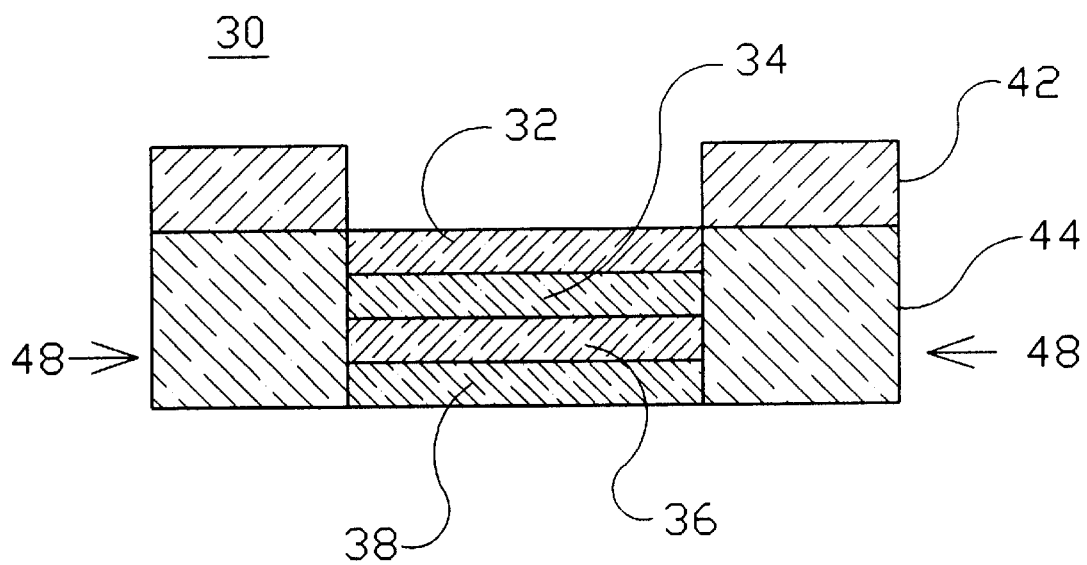
FIG. 2 is a sectional view representing an MR read transducer having hard magnetic biasing end regions, in accordance with the present invention.

FIG. 2 shows the MR read transducer 30 of the present invention, having an exchange layer 32 adjacent to a soft adjacent layer 34. The exchange layer 32 produces a transverse bias in order to saturate the soft adjacent layer 34. An MR trilayer, i.e., soft adjacent layer (SAL) 34 and MR layer 38 separated by a spacer layer 36, functions substantially the same as the central active layer 16 in FIG. 1. However, the addition of exchange layer 32, in magnetic and electrical continuity with SAL 34, produces a field transverse to the MR trilayer. This exchange field enables saturation of the SAL 34 either without a sense current or at relatively low sense currents.

The MR transducer of this invention includes a means of generating a longitudinal bias. FIG. 2 shows passive end regions 48, which are used in the preferred method of generating longitudinal biasing. End regions 48 include a hard magnetic bias layer 44 and a conductive layer 42. The hard magnetic biasing layer may be composed of a single layer of material, such as an alloy of cobalt-chromium, cobalt-platinum, or cobalt-chromium-platinum. Alternatively, the use of undercoating or overcoating with tungsten or gold may be desirable. Although the preferred longitudinal biasing means involves end regions having a hard magnetic biasing layer and a conductive layer, as shown in FIG. 2, the invention contemplates all means for generating longitudinal bias known in the art, and is not limited to those transducers having hard biasing end regions.

The exchange layer 32 may be composed of a variety of materials which will generate an exchange field transverse to the trilayer. In one embodiment, the exchange layer 32 is composed of an insulating composition of nickel oxide and cobalt oxide (NiO/CoO). Preferably, the NiO/CoO layer is about 300 to 350 Angstroms. In another embodiment, the exchange layer is composed of an iron-manganese material (FeMn). The preferred thickness of the FeMn layer is about 150 to 350 Angstroms. The thickness and composition of the exchange layer 32 are chosen to produce the desired reduction in the sense current required to saturate the soft adjacent layer 34.

The compositions and thicknesses of the MR trilayer, i.e., the magnetoresitve layer 38, the spacer layer 36, and the soft adjacent layer 34, depends on the specific application. The MR layer 38 may be composed of any magnetoresistive material known in the art. Preferably, the MR layer 38 is composed of a nickel-iron alloy and ranges from about 50 to 400 Angstroms in material which may be easily remagnetized with a low magnetic field. Additionally, the SAL material must exchange couple to an appropriate ferromagnetic or ferrimagnetic material. Common soft magnetic materials useful in forming an SAL include, without limitation, Mu-metal, Permalloy, Alfesil, ferrites, and hot-pressed ferrites. The spacer layer 36 may be a conducting or insulating material, but preferably is conducting non-magnetic material.

The transducer 30 may be formed by any methods known in the art. A process of forming the transducer is disclosed in U.S. Pat. No. 5,018,037 (See columns 3–4 and FIGS. 3–5), which is hereby incorporated by reference. The exchange layer 32 may be deposited in a similar fashion to the deposition of the MR trilayer. A substrate for supporting the layers of the assembly is not shown since it is not considered to be necessary for explanation of the invention.

It should be understood that various modifications to the invention may be made without departing from the scope of this invention.

What is claimed is:

1. A magnetoresistive read transducer for sensing magnetic signals and converting said signals to electrical signals, comprising:

a unitary magnetoresistive layer;

a spacer layer formed over said magnetorsistive layer;

a soft active layer for providing magnetic bias to said transducer formed over said spacer layer;

an antiferromagnetic exchange layer deposited over said soft active layer for generating an exchange field along a direction transverse to said soft adjacent layer, and for reducing the sense current required to saturate said soft active layer;

said magnetoresistive layer, said spacer layer, said soft active layer, and said antiferromagnetic exchange layer being coextensive and having aligned ends;

hard magnetic biasing layers in contact with all of said aligned ends for providing longitudinal bias to said transducer; and conductive elements formed over said hard magnetic bias layers;

whereby a sense voltage is generated in said transducer when said transducer is passed over magnetic storage media.

2. A magnetoresistive read transducer as in claim 1, wherein said exchange layer comprises nickel oxide and cobalt oxide.

3. A magnetoresistive read transducer as in claim 2, wherein the thickness of said exchange layer is about 300 to 350 Angstroms.

4. A magnetoresistive read transducer as in claim 1, wherein said exchange layer comprises iron manganese.

5. A magnetoresistive read transducer as in claim 4, wherein the thickness of said exchange layer is about 150 to 350 Angstroms.

* * * * *